United States Patent [19]
Mizuse et al.

[11] Patent Number: 5,182,807
[45] Date of Patent: Jan. 26, 1993

[54] ASSEMBLER SYSTEM FOR DETERMINING WHEN TO COMPILE SOURCE CODE MODULES

[75] Inventors: Harumi Mizuse; Kazuhide Kawata, both of Tokyo, Japan

[73] Assignee: NEC Corporation, Tokyo, Japan

[21] Appl. No.: 286,118

[22] Filed: Dec. 19, 1988

[30] Foreign Application Priority Data

Dec. 18, 1987 [JP] Japan .................. 62-320504
Dec. 31, 1987 [JP] Japan .................. 62-334995

[51] Int. Cl.$^5$ ............................................. G06F 9/45
[52] U.S. Cl. ......................... 395/700; 364/DIG. 1; 364/280.1; 364/280.4
[58] Field of Search ............. 364/200, 900, DIG. 1, 364/DIG. 2; 395/700

[56] References Cited

U.S. PATENT DOCUMENTS

| | | | |
|---|---|---|---|
| 4,330,822 | 5/1982 | Dodson | 364/200 |
| 4,558,413 | 10/1985 | Schmidt et al. | 395/700 |
| 4,667,290 | 5/1987 | Goss et al. | 364/300 |
| 4,809,170 | 2/1989 | Leblang et al. | 395/700 |
| 4,897,780 | 1/1990 | Lakness | 364/200 |

OTHER PUBLICATIONS

Aho, Alfred V., Sethi, Ravi, Ullman, Jeffrey D. "Compilers Principles, Techniques and Tools", ©1986. Addison-Wesley.
Walker, Billy K. "Modula-2 Programming with data structures", ©1986. Wadsworth, Inc.
Gries, David, "Compiler Construction For Digital Computers", ©1971. John Wiley & Sons, Inc.
Ford, Gary A., Wiener, Richard S. "A Software Development Approach Modula-2". ©1986 John Wiley & Sons, Inc.
Feldman, S., "Make—A Program for Maintaining Computer Programs," *Software—Practice and Experience*, vol. 9, 255-265 (1979).
Horsley, T. et al., "Pilot: A Software Engineering Case Study," Proceedings of the 4th International Conference on Software Engineering, pp. 94–99 (1979).
C. Ghezzi et al.: "Programming Language Concepts, John Wiley & Sons, 1982, Chapter 7, New York, US, Section 7.3.3", pp. 201–226.

Primary Examiner—David L. Clark
Assistant Examiner—Matthew C. Fagan
Attorney, Agent, or Firm—Foley & Lardner

[57] ABSTRACT

An assembler system translates a source program having a plurality of source code modules. The source code modules are evaluated in order to identify which source code module is the first source code module for which:
(1) an object code module has not been assembled,
(2) the source code module production time is later than the corresponding object code module production time, or
(3) the source code module is positioned differently than it is in a recorded order.

This first identified source code module, and the source code modules succeeding it, are assembled in accordance with the current assemble order.

2 Claims, 14 Drawing Sheets

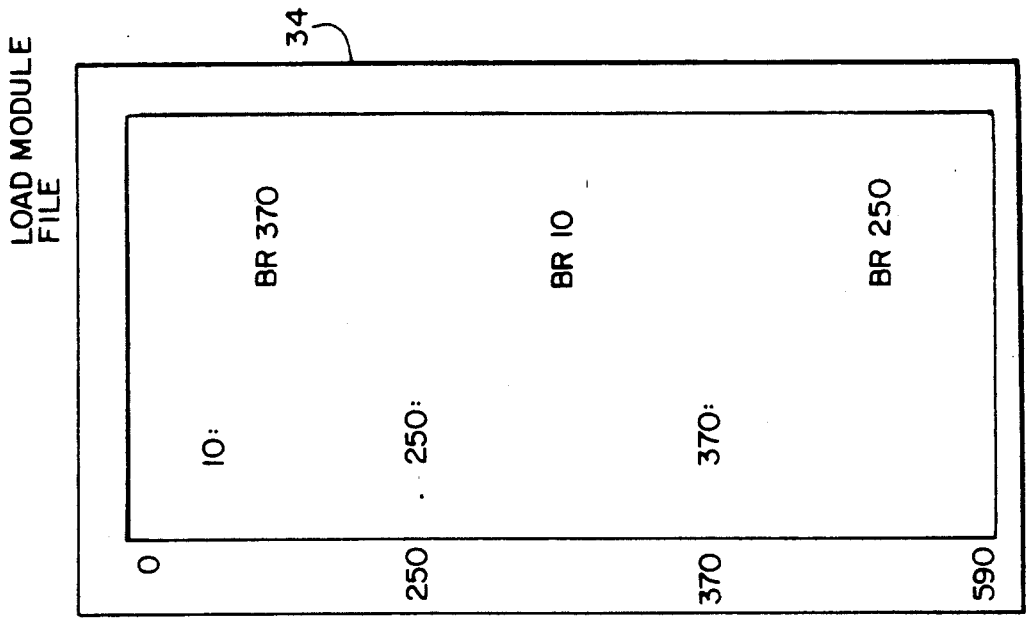
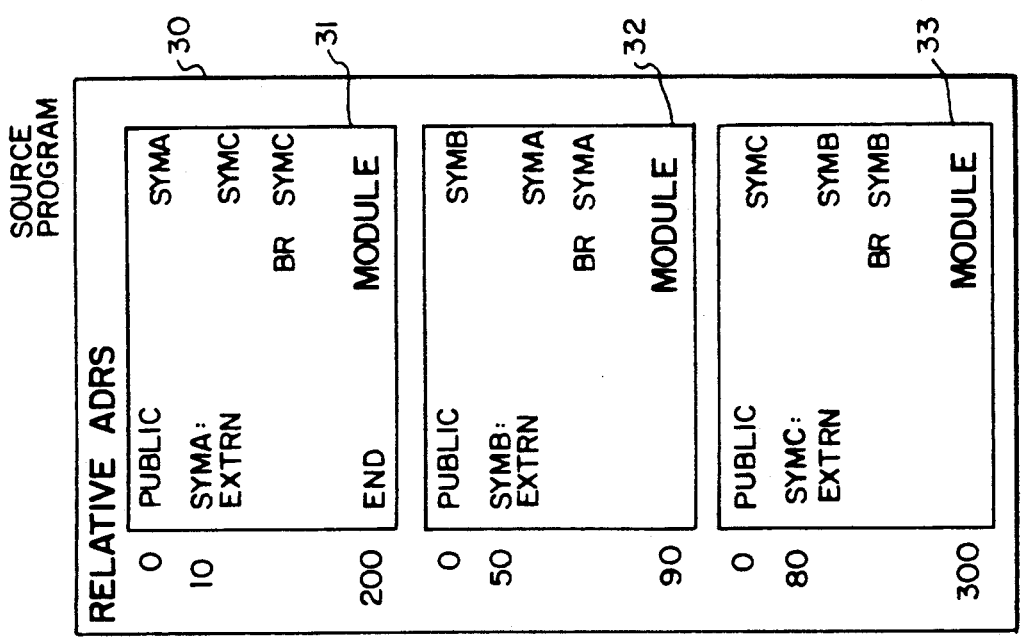

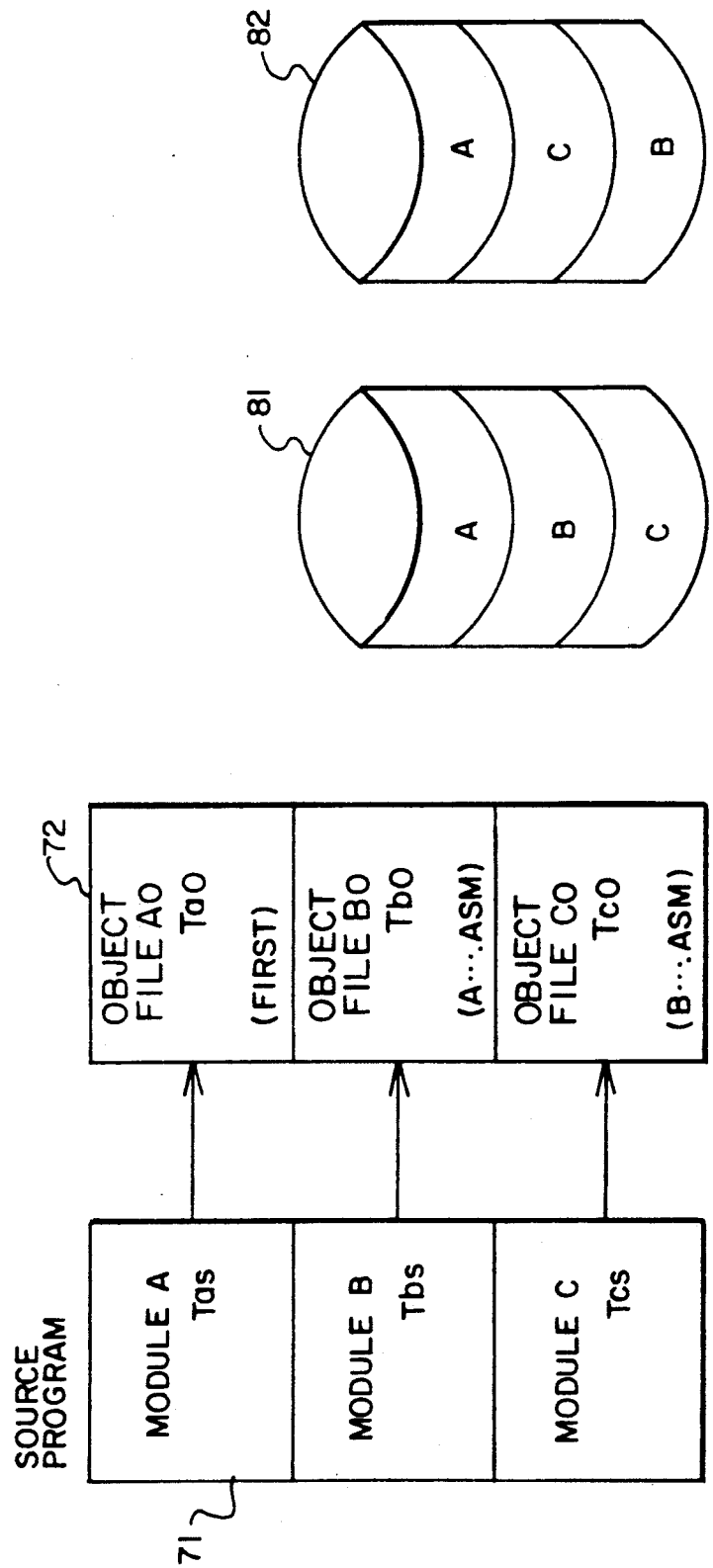

SYMBOL TABLE

| SYM A | VALUE A | |
|---|---|---|
| SYM C | | E |
| | | |
| | | |

FIGURE 15A

PUBLIC SYMBOL TABLE

| SYM A | VALUE A |
|---|---|
| | |
| | |
| | |

FIGURE 15B

SYMBOL TABLE

| SYM B | VALUE B | |
|---|---|---|
| SYM A | | E |
| | | |
| | | |

FIGURE 16A

PUBLIC SYMBOL TABLE

| SYM A | VALUE A |
|---|---|
| SYM B | VALUE B |
| | |
| | |

FIGURE 16B

SYMBOL TABLE

| SYM C | VALUE C | |
|---|---|---|
| SYM B | | E |
| | | |
| | | |

FIGURE 17A

PUBLIC SYMBOL TABLE

| SYM A | VALUE A |
|---|---|
| SYM B | VALUE B |
| SYM C | VALUE C |
| | |

FIGURE 17B

ASSEMBLER SYSTEM FOR DETERMINING WHEN TO COMPILE SOURCE CODE MODULES

BACKGROUND OF THE INVENTION

1. Field of the invention

The present invention relates to an assembler system for translating a source program written in assembly language which is a program describing language, for microcomputers, into a machine code or language, and more specifically to an assembler system for a program which is divided into a plurality of modules so that a symbol is referred to between the modules.

2. Description of related art

In general, an assembler can be defined as a program which translates a source program written in assembly language, into a machine language, which can be directly executed by a microcomputer. Referring to FIG. 1, there is shown one typical operation environment for the assembler. This system includes an auxiliary storage 10, such as a magnetic disk memory for storing a source program and an assembler program and also storing the result of an output as a file. The system also includes a central processing unit (CPU) 12 which receives a source program loaded from the auxiliary storage 10 and assemble the received program. In the course of the assemble operation of the CPU 12, a main memory (MM) 14 is used, and the operation of the CPU 12 is controlled by an operation system (OS) 16. In order to input a command to the operation system 16 and to cause the result of processing to be indicated, there are provided a key board 18 and a display 20.

Operation of the assembler is initiated by inputting a command to the operation system by use of the keyboard 18. First, an assembler program is loaded from the auxiliary storage 10 to the main memory 14 so that the assembler program is executed by the central processing unit 12. In accordance with progress of the execution of the assembler program, a source program is sequentially read from the auxiliary storage 10, and translated into a machine language. The machine language obtained is stored in the auxiliary storage 10 as an object file.

Conventionally, the system of the assembler can be divided into two types, namely a so-called "relocatable assembler" and a so-called "absolute assembler". Now, explanation will be made on the two types of assemblers.

The relocatable assembler generates a machine language which can be relocated into any desired address. Therefore, it makes modification of the program easy. In the relocatable assembler, as shown in FIG. 2, a source program 21 is divided into a plurality of modules, MODULE-1, MODULE-2 and MODULE-3, in accordance with their functions and other factors. In an input step 22, these modules are individually inputted by use of the keyboard 18 so that they are stored into the auxiliary storage 10 as corresponding different source module files 23. The relocatable assembler 24 separately assembles these source module files 23, MODULE-1, MODULE-2 and MODULE-3, and generates an object program expressed in machine languages in the form of relocatable object files 25. Since the relocatable assembler 24 translates the source module files 23 independently of one another, each instruction of the obtained machine language program in the relocatable object files 25 is assigned with a relative address as a memory address, so that an address can be determined independently between the modules.

In order to combine the machine language programs in the separate relocatable object files 25 into a form which can be executed by a microcomputer, these separate machine language programs are linked by a linker (linkage editor) 26. At this time, the relative addresses in the separate relocatable object files 25 are converted into absolute memory addresses by the linker 26. Thus, the machine language program having the absolute addresses given by the linker 26 is stored as a load module file 27.

In the above mentioned relocatable assembler system, the program is not required to pay attention to the formation or organizational order of the modules MODULE-1, MODULE-2 and MODULE-3. In other words, it is sufficient if the order of the modules is designated only at the time of the linkage editing. This means that when one module has been modified, if the other modules have not been modified, it is sufficient if only the modified module is assembled. In this case, the load module can be generated by simply linking the newly assembled relocatable object file to the relocatable object files for the other (not-modified) modules. This feature is advantageous in that, when it is necessary to modify only a small portion of a large program, the amount of the source program to be assembled can be very small, and therefore, the assembling time is greatly reduced.

However, since each module is assembled independently of the other modules in the relocatable assembler system, some complicated management is required in the case that a symbol referred to in one module is defined in another module.

Namely, a so-called assembly language contains a pseudo instruction for naming any data or address. For example, if in a source program there is described or written a name which is assigned a value of data or address by the pseudo instruction, the name is converted into a corresponding value at the time of assembling. This name is commonly called a "symbol" and composed of a character string, and a writing of a symbol into a source program is called a "symbol reference". If a symbol reference has been made, it is necessary to place a value assigned to a symbol, into the location where a symbol is written. Therefore, there is prepared beforehand a symbol table which indicates correspondence between symbols and values. This symbol table is located in a portion of the main memory 14.

Therefore, the assembler is ordinarily of a 2-pass assembler system so that a source program is analyzed in two divided phases. Namely, in a PASS 1, which forms a first analysis phase, portions which respectively define symbols are extracted from the source program, and a symbol table indicating correspondence between symbols and values assigned to the symbols is prepared within the main memory. Thereafter, in a PASS 2 which forms a second analysis phase, the symbol referring portions are replaced by corresponding values on the basis of the symbol table.

In the relocatable assembler, if the definition of the symbols and the symbol reference are made in only the same one module, the above mentioned assembler system is sufficient and satisfactory. However, if the definition of the symbols and the symbol reference are made between different modules, special management is required. In general, the former is called a local symbol and the latter is called a public symbol. For example, if one module refers to a public symbol defined in another module, since the public symbol is not registered in a symbol table prepared in the PASS 1 of the assemble operation, a corresponding value cannot be referred to in the PASS 2 of the same assemble operation. As a result, the result of the assembler is outputted to the relocatable object file 25 with the public symbol being in an unsolved condition.

For example, consideration is made of a source program 30 shown in FIG. 3A. The source program 30 includes three modules 31, 32 and 33, in which symbols "SYMA", "SYMB" and "SYMC" defined at relative addresses 10, 50 and 80 are referred to by an instruction BR in an external module. However, since the modules 31, 32 and 33 are separately assembled, operands of instructions "BR SYMC" in the module 31, "BR SYMA" in the module 32 and "BR SYMB" in the module 33 are not converted into numerical values, and therefore, are outputted in an unsolved condition to the relocatable object files 25. Thus, the linker 26 shown in FIG. 2 operates to translate the relatively allocated memory addresses of these relocatable object files 25 into absolute addresses 0-590 as shown in FIG. 3B. The linker 26 also operates to allocate values to the symbols SYMA, SYMB and SYMC, which have not been solved at the time of assembling the respective modules, and then to output the obtained result as a load module file 34 shown in FIG. 3B.

Considering another aspect of the relocatable assembler, a MAKE function of the UNIX system, which is one known operating system, can be applied to the relocatable assembler. This MAKE function is such that when some of modules of a source program are modified, only the modified modules are automatically selected and re-assembled. This function is realized by comparing the production time of the source modules, and the production time of the object modules and judging that any modification has been added when the source module is newer than the object module. Therefore, this function omits an operation for designating the modules to be re-assembled. However, it cannot omit the linkage editing after assembling, similarly to the conventional relocatable assembler.

In the absolute assembler, contrary to the relocatable assembler, a memory address is allocated in the form of an absolute address to instructions and data. For example, as shown in FIG. 4, a source program 41 is inputted at a step 42 by using the keyboard 18 shown in FIG. 1, so that a source file 43 is obtained. This source file 43 is translated by an assembler 44 into an object file 45, which can be directly executed by a computer by loading it as a load module file. In addition, the management of symbols in the absolute assembler is performed with only a symbol table provided in the main memory 14. Therefore, when a symbol is referred to, the symbol table is searched and a value corresponding to the symbol is extracted so as to be placed at a position describing the symbol.

In the absolute assembler system, the number of the source module and the number of the object module which form the load module are only one, respectively, and therefore, it is not necessary to refer to an external module for a symbol analysis differently in the case of the relocatable assembler. Accordingly, no unsolved symbol is generated in the assembler. Furthermore, since an absolute address is allocated as a memory address, the linkage editing which is required in the relocatable assembler is not necessary.

As mentioned above, the conventional relocatable assembler is advantageous in that when a source program is partially modified and reassembled, since the relocatable assembler can separately assemble each division module, it is sufficient if only the modified module is reassembled. However, after the re-assemble of the modified module has been completed, it is necessary to link all the source modules, similarly to the linkage editing performed before the re-assemble. This linking processing requires a substantial time.

Furthermore, the relocatable assembler utilizing the MAKE function of the UNIX system is advantageous in that a modified module is automatically searched and then only the modified module is reassembled. However, the linking is still required after the re-assemble, and therefore, the processing time is not substantially reduced.

In the absolute assembler, on the other hand, since a source program is not divided into modules, no unsolved symbol remains after the assemble. In addition, since the address is expressed by the absolute address, the linkage editing is not required and therefore the processing time is reduced by the time for the linkage editing. However, if a source program is modified even a little, all of the source program must be re-assembled. Therefore, substantial time is required for the assemble.

Considering the symbol table in the relocatable assembler, the symbol table is individually formed for each of the modules constituting a source program when the source program is assembled. Therefore, each symbol table is small in size, and, accordingly, can be searched in a decreased time. However, after the assemble has been completed for all the modules, a reference to unsolved symbols must be performed in the course of the linking processing. Therefore, in the case of a large number of public symbols, link processing needs a long time.

In the absolute assembler system which prepares one symbol table for one source program, on the other hand, the larger the source program becomes, the larger the symbol table also becomes, and therefore, a search of the symbol table entails a long time. As a result, the assemble speed is lowered.

SUMMARY OF THE INVENTION

Accordingly, it is an object of the present invention to provide an assembler system which overcomes the above mentioned defect of the conventional one.

Another object of the present invention is to provide an assembler system capable of assembling at a high speed.

Still another object of the present invention is to provide a high speed assembler system having a reduced symbol search time and a decreased linking processing time.

The above and other objects of the present invention are achieved in accordance with the present invention by an assembler system for translating a source program written in assembly language and divided into a plurality of modules, into a machine language, comprising means storing an organization order of the plurality of modules which constitute the above mentioned source program, means for discriminating whether or not there exist a plurality of object module files prepared by assembling the source module, means for recording a positional relation between the object module files on the basis of the order of assemble, means for comparing a source module production time with an object file production file, so that, in the course of a sequential assemble of the source modules in accordance with the order recorded in the organization order storing means, when at least one of the following facts is detected;

(1) the fact that there does not exist an object module file corresponding to the source module is detected;

(2) the fact that the order of the source module recorded in the organization order recording means is different from the order recorded in the object module positional relation recording means; and (3) the fact that the production time of the source module is later than that of the corresponding object module file, a portion of the source program including the above source module and all the succeeding source modules in the organization order are assembled.

According to another aspect of the present invention, there is provided an assembler system for translating a source program written in assembly language and divided into a plurality of modules, at least one of which includes a reference to a public symbol defined in another module, in a predetermined organization order for each of the modules, so as to prepare corresponding object files, the assemble for each of the modules being executed by performing a first procedure in which a character string and a corresponding value of a local symbol defined in each module as well as a character string and a corresponding value of a public symbol referred to in that module but defined in another module are extracted and stored in a symbol table formed in a main memory, and then a second procedure in which the character string and the corresponding value of a public symbol defined in that module are extracted and stored in a public symbol table formed in an auxiliary memory, and a value of the public symbol, only the character string of which is stored in the symbol table, is searched from the public symbol table, and then, is given with a value found from the public symbol table.

The above and other objects, features and advantages of the present invention will be apparent from the following description of preferred embodiments of the invention with reference to the accompanying drawings.

BRIEF DESCRIPTION OF THE DRAWINGS

FIG. 3A and 3B respectively illustrate examples of the source program and the load module file prepared in the conventional assembler system shown in FIG. 2;

FIG. 7 illustrates one specific example of the assemble processing in accordance with the present invention;

FIGS. 8A and 8B show memory blocks respectively indicating examples of the ".SEQ" file which indicates the organization order of modules in the source program;

FIGS. 15A, 16A and 17A show the contents of the symbol tables for different modules corresponding to the source module shown in FIG. 3A; and FIGS. 15B, 16B and 17B show the contents of the public symbol tables for different modules corresponding to the source module shown in FIG. 3A.

DESCRIPTION OF THE PREFERRED EMBODIMENTS

Figure 5:
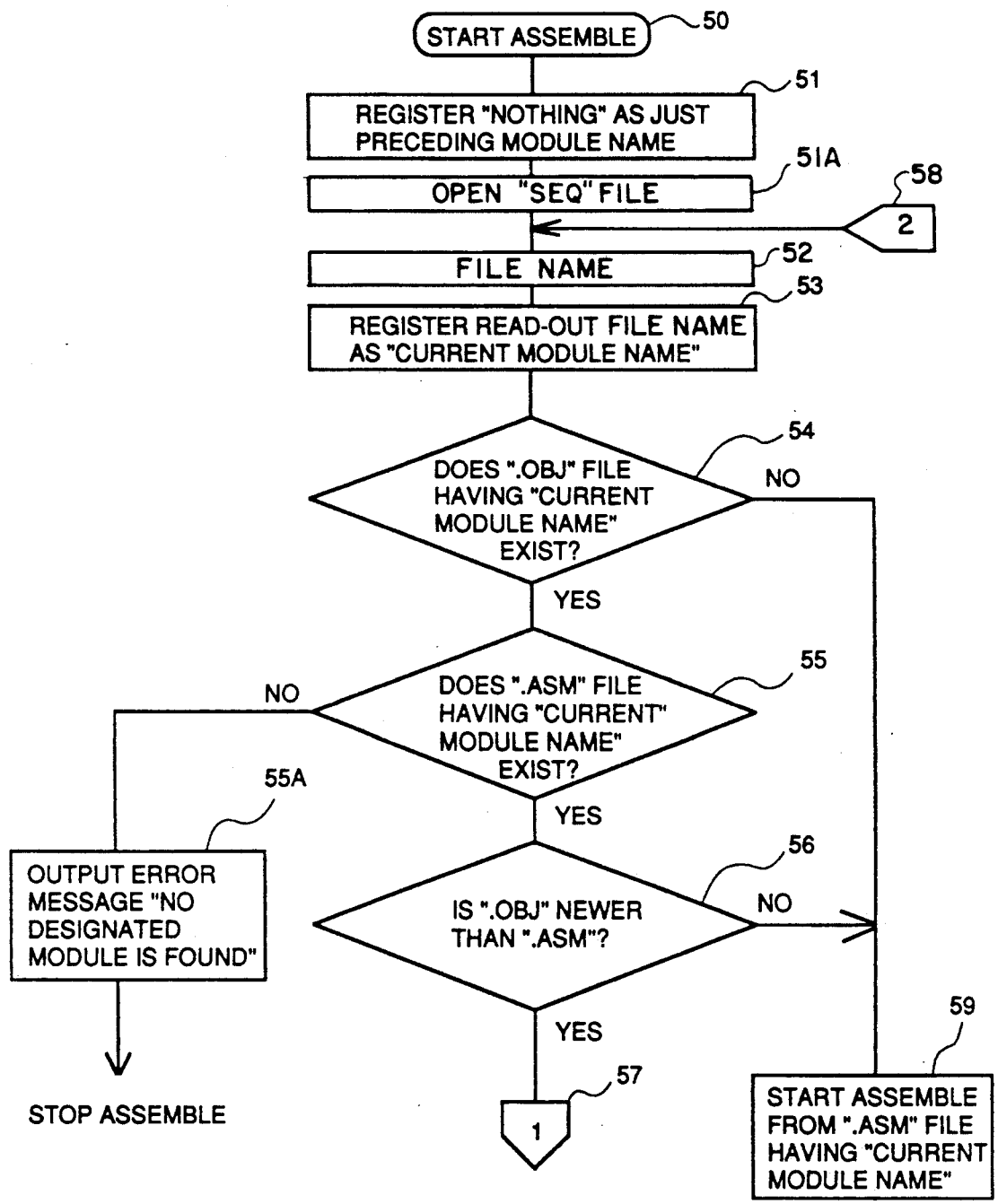
FIG. 5 is a flow chart of assembling a modularized source program in accordance with one embodiment of the present invention.

Referring to FIG. 5, there is shown a flow chart for assembling a modularized source program in accordance with one embodiment of the present invention. Here, as a method for giving names to files of assembler, it is a current practice to add, after a file name, a point (.) and an extension or escape character of three characters which are unified in accordance with property of the file. In this embodiment, therefore, a file added with ".ASM" means a source module file and a file added with ".OBJ" means an object module file. A file added with ".SEQ" means a file storing an organization order when the modules are assembled. In other words, ".ASM" is indicative of the source module file, and ".OBJ" indicates the object module file. A file added with ".SEQ" is called an organization order storing file.

Turning to FIG. 5, an assemble program is initiated at a step 50. In a step 51, "NOTHING" is registered as "JUST PRECEDING MODULE NAME" within an area of the main memory 14 for storing a module organized just before an module to be assembled. In a next step 51A, ".SEQ" file is opened. In a step 52, a file name in the file is read out. In a step 53, the read-out file name is registered as "CURRENT MODULE NAME" within the main memory 14. In a step 54, it is determined whether or not a ".OBJ" file having the "CURRENT MODULE NAME" exists within the auxiliary storage 10. If it does not exist, the processing moves to a step 59 for assembling a source file having the "CURRENT MODULE NAME". If a ".OBJ" file having the "CURRENT MODULE NAME" exists within the auxiliary storage 10, the processing moves to a step 55 for re-assemble. In the step 55, first, it is determined whether or not a source file ".ASM" file having the "CURRENT MODULE NAME" exists within the auxiliary storage 10. If it does not exist, the processing goes to a step 55A in which an error message "NO DESIGNATED MODULE IS FOUND" is outputted to the display 20 and then the assemble is stopped. If it exists, the processing goes to a step 56 where the production times of the ".OBJ" file and the ".ASM" file are compared, and if the ".ASM" file is newer than the ".OBJ" file, it is judged that a modification has been added to the source module after the ".OBJ" file has been prepared. Therefore, the processing goes to the step 59, where an assemble is started from the ".ASM" file having the "CURRENT MODULE NAME", in accordance with a sequence designated by the ".SEQ" file. If the ".OBJ" file is newer than the ".ASM" file, it goes to a step 57 for determining whether or not the organization order has been changed in the ".SEQ" file.

Figure 6:
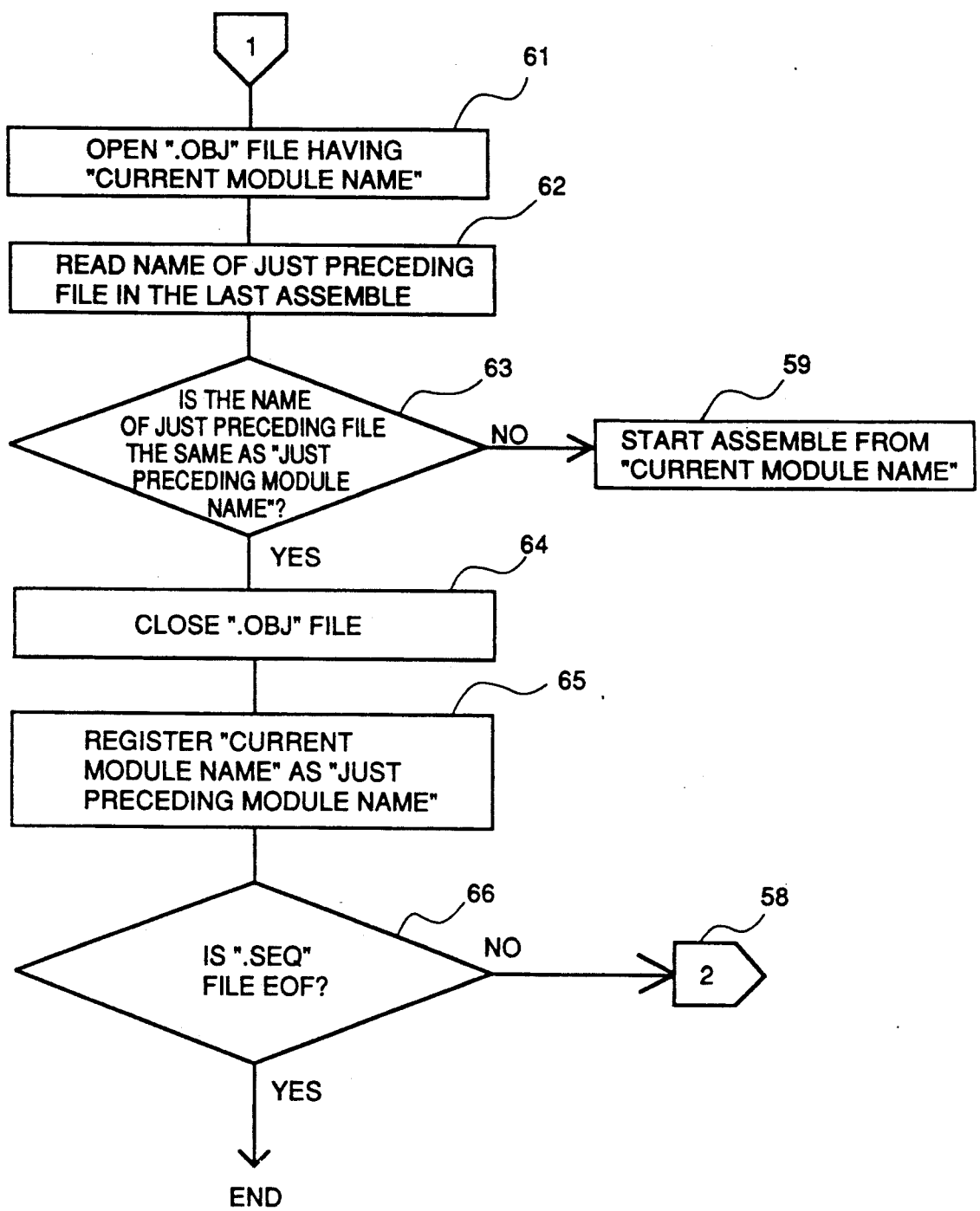
FIG. 6 is a detailed flow chart of one step shown in FIG. 5.

Referring to FIG. 6, there is shown a detailed flow chart of the step 57 shown in FIG. 5. First, in a step 61, the ".OBJ" file having the "CURRENT MODULE NAME" is opened. The ".OBJ" file records a name of a just preceding file in the organization order at the time of the last assemble. In a step 62, the name of the just preceding file is read to the main memory 14, and in a step 63 there is confirmed whether or not the name of the just preceding file is the same as the "JUST PRECEDING MODULE NAME". If it is not the same, it is then judged that the module organization order has been changed from the ".ASM" file having the "CURENT MODULE NAME". Therefore, the processing goes to the step 59 so that the assemble is started from the ".ASM" file having the "CURENT MODULE NAME". If the name of the just preceding file is the same as the "JUST PRECEDING MODULE NAME", it is then judged that the ".ASM" file having the "CURENT MODULE NAME" is located or organized at the same order as that of the last assemble. Thereafter, the ".OBJ" file is closed in a step 64, and the "CURRENT MODULE NAME" is registered as "JUST PRECEDING MODULE NAME" in the auxiliary storage 10 in a step 65. Furthermore, the processing is returned to the ".SEQ" file and it is confirmed in a step 66 whether or not the assemble has been completed. If a file name is described, the processing is returned to the step 52, and a next line is read out so that the above mentioned processing is repeated.

Referring to FIG. 7, there is illustrated one specific example of the above mentioned processing. A block 71 indicates a source program divided into three modules A, B and C, and a block 72 shows object module files Ao, Bo and Co corresponding to the modules A, B and C. The modules A, B and C respectively record the file production times Tas, Tbs and Tcs, and the object module files Ao, Bo and Co respectively record the file production times Tao, Tbo and Tco. In addition, the object module files Ao, Bo and Co respectively record the module name organized in the last assemble. Turning to FIGS. 8A and 8B, memory blocks 81 and 82 respectively show examples of the ".SEQ" file, which indicates the organization order of modules in the source program now to be assembled.

Now, assume that the file production times Tas and Tbs are earlier than Tao and Tbo, but Tcs is later than Tco. In this situation, an explanation will be made of the assemble of the source program 71 in accordance with the ".SEQ" file 81. First, the assembler compares the production time of the module A with that of the file Ao, and confirms that the ".OBJ" file is newer and that the file Ao is a firstly prepared ".OBJ" file. As a result, the assemble for the module A is skipped and the processing goes to the module B. In the module B, it is confirmed that the ".OBJ" file is newer and that the file name recorded in the file Bo is the just preceding file name A. Therefore, the assemble for the module B is also skipped, and it goes to the module C. In the module C, the organization order has not been changed but it is judged that a modification has been added to the module C, since the ".ASM" file is newer. Therefore, the assemble is started from the module C.

Next, explanation will be made on the assemble of the source program 71 in accordance with the ".SEQ" file 82. The ".SEQ" file 82 records therein the organization order of the modules as being A, C and B. In the module A, the assemble is skipped similarly to the case of the ".SEQ" file 81. In the next module C, since the ".ASM" file is older than the ".OBJ" file, the ".ASM" file has not been modified. However, the just preceding file name recorded in the object file Co is B, and on the other hand, the module just before the module C is the module A. Therefore, it is judged that the organization order has been changed, and therefore, the assemble is started from the module C.

Figure 9:
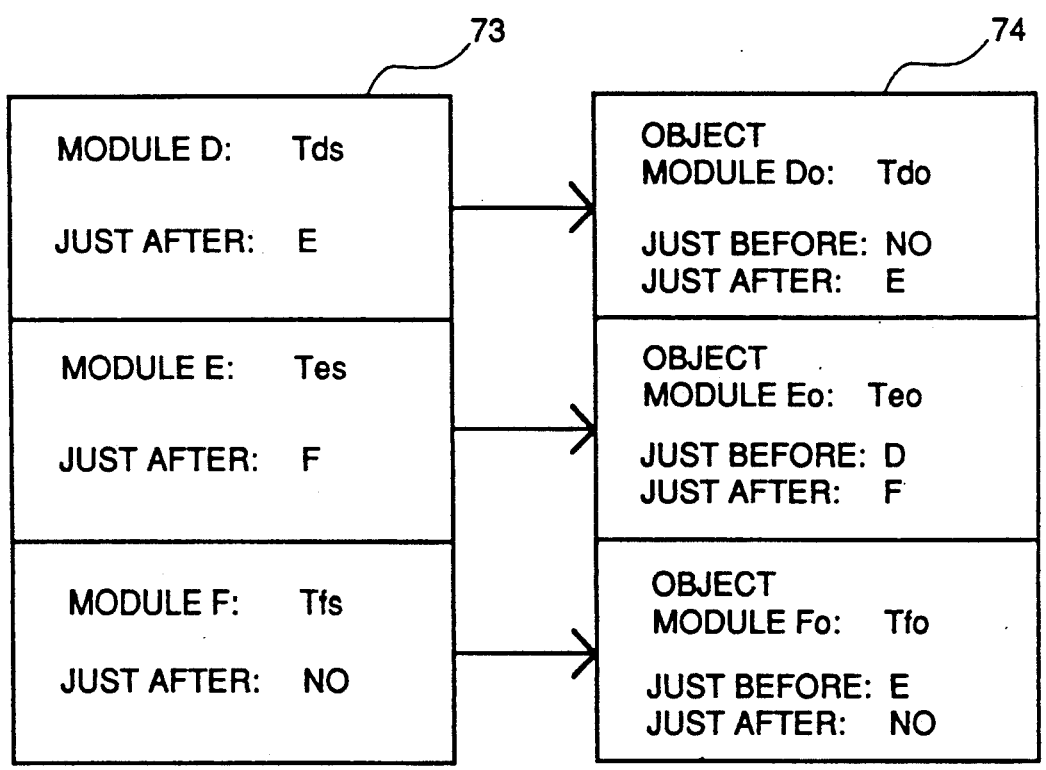
FIG. 9 illustrates a recording file in accordance with a second embodiment of the present invention.

Referring to FIG. 9, there is illustrated a recording file in accordance with a second embodiment of the present invention. In the shown embodiment, the organization order at the time of the assembling is directly stored in the source modules stored in the auxiliary storage 10, without preparing the recording files shown in FIG. 8.

A block 73 shown in FIG. 9 indicates a source program divided into modules D, E and F, and a block 74 shows object module files Do, Eo and Fo corresponding to the modules D, E and F. The modules D, E and F respectively record the file production times Tds, Tes and Tfs, and the module name organized just after each module. On the other hand, the object module files Do, Eo and Fo respectively record the file production times Tdo, Teo and Tfo. In addition, each of the object module files Do, Eo and Fo records the source module name recorded in the corresponding source module at the time of the object module production, namely the source module name organized just after each corresponding source module. Furthermore, each of the object module files Do, Eo and Fo records the source module name assembled just before the corresponding source module.

Figure 10:
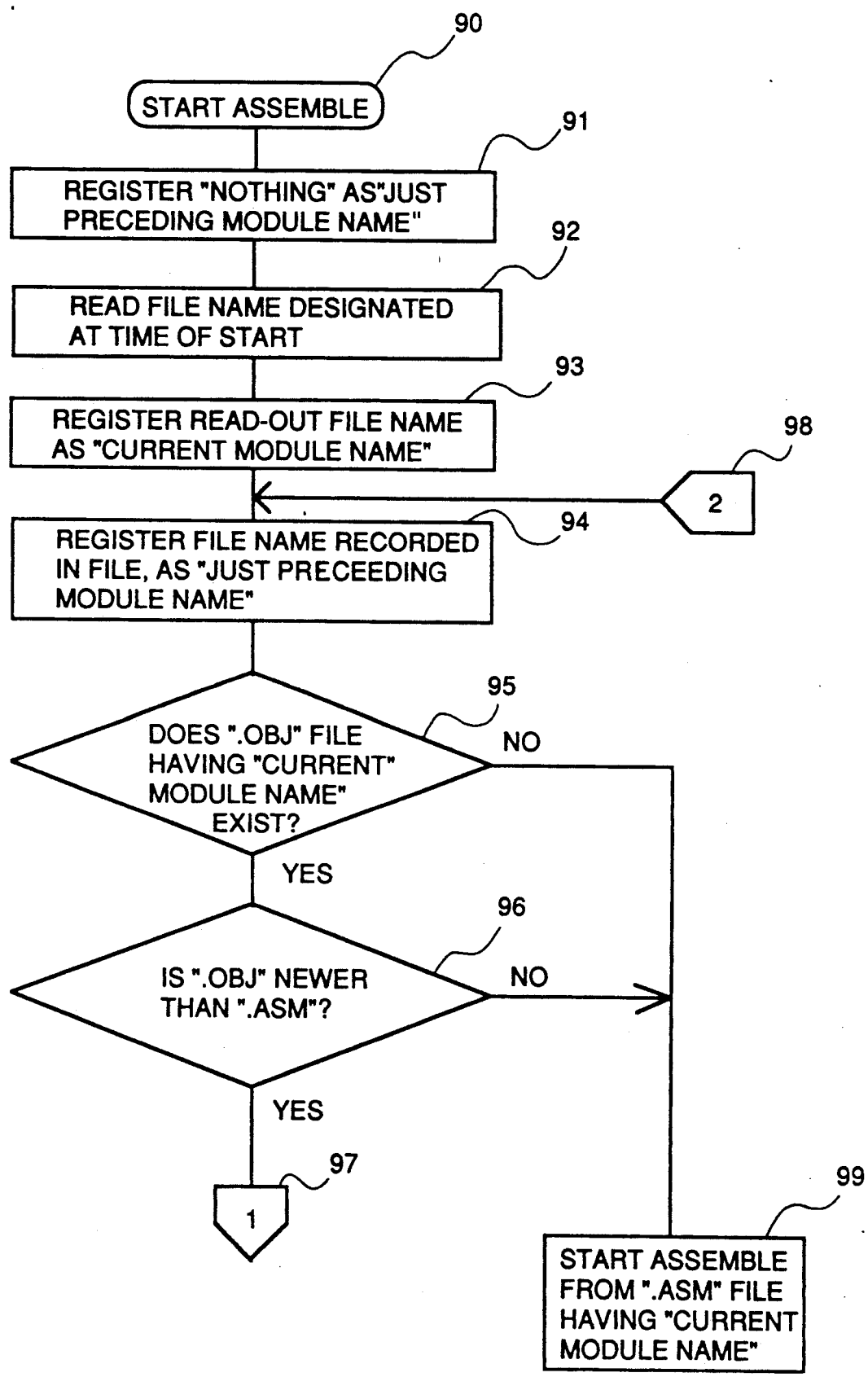
FIG. 10 is a flow chart illustrating the processing in accordance with the second embodiment of the present invention.

Turning to FIG. 10, there is shown a flow chart illustrating the processing in accordance with the second embodiment. Namely, after the assemble is started, a source module name positioned at a first place of the organization order is designated at a step 90, and "NOTHING" is registered as the "JUST PRECEDING MODULE NAME" at a step 91. In a step 92, the source module name designated at the step 90 is read out, and then, registered as the "CURRENT MODULE NAME" into the main memory. In a next step 94, the module name recorded in the source module is registered as the "JUST PROCEEDING MODULE NAME" into the main memory. In a step 95, it is judged whether or not the ".OBJ" file having the "CURRENT MODULE NAME" exists. If it does not exist, the processing goes to a step 99 where the assemble is started from the "CURRENT MODULE NAME". At this time, before the assemble for one source module is started, the module name recorded in that source module is registered as the "JUST PROCEEDING MODULE NAME" in the main memory. In addition, after the assemble of the "CURRENT MODULE NAME" has been completed, the "JUST PROCEEDING MODULE NAME" is registered as the "CURRENT MODULE NAME" and the assemble is succeedingly executed.

Figure 11:
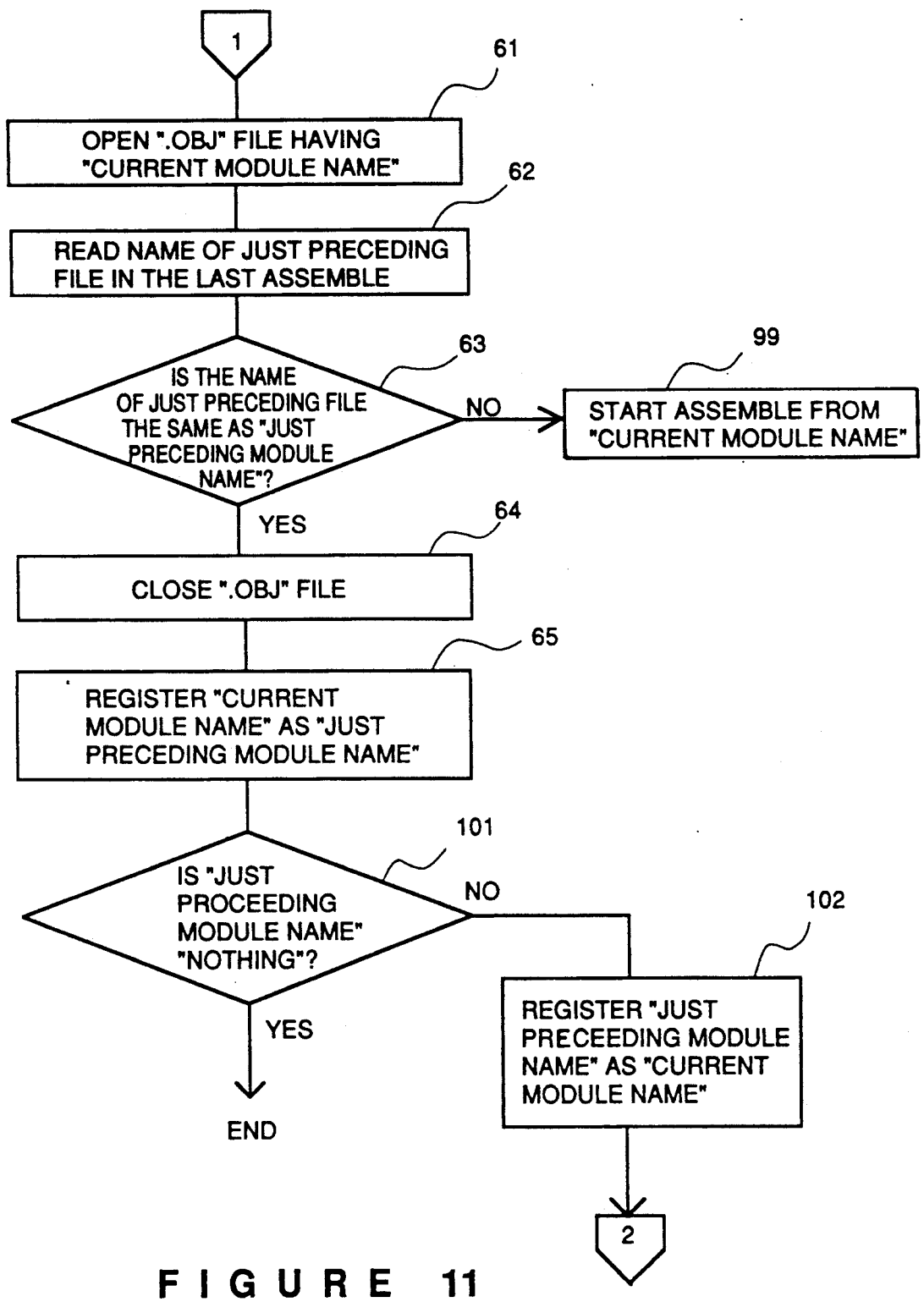
FIG. 11 is a flow chart illustrating the processing performed after the processing shown in FIG. 10.

In the step 95, if it is judged that the ".OBJ" file exists, the production time of the ".OBJ" file is compared with the production time of the ".ASM" file in a step 96. If the ".ASM" file is newer than the ".OBJ" file, the assemble is started. On the other hand, if the ".OBJ" file is newer than the ".ASM" file, the processing goes to the steps shown in FIG. 11. In FIG. 11, steps 61 to 65 and 99 are the same as the steps 61 to 65 and 59 shown in FIG. 6, and therefore, an explanation thereof will be omitted. After the "JUST PRECEDING MODULE NAME" is registered in the step 65, it is confirmed in a step 101 whether or not the "JUST PROCEEDING MODULE NAME" is "NOTHING". If it is "NOTHING", the assemble is completed. If it is not "NOTHING", the processing goes to a step 102 where the "JUST PROCEEDING MODULE NAME" is registered as the "CURRENT MODULE NAME", and then, the processing is returned to the step 94. Thus, the assemble for the "CURRENT MODULE NAME" is skipped, and the processing goes to the assemble for the source module organized just after the "CURRENT MODULE NAME".

As seen form the above mentioned embodiment, in the case that a source program which has already subjected to one or more assembles is re-assembled after a modification has been added or after the organization order has been changed, the assembler in accordance with the present invention skips the assemble of the modules until the assembler automatically detects a modified portion, and thereafter, re-assembles only the modified module and succeeding modules. This is advantageous, since it is not necessary to assemble a module or modules before a modified module in the case that a modification has been made to one or more of a second and succeeding modules. Therefore, the time for the assemble can be reduced.

Since the MAKE function of the UNIX system assembles only a modified module or modules, it is advantageous in that the assemble time is short. However, when the source program is very large, a considerable time has been required for the linking processing made after the assemble. On the other hand, the assembler in accordance with the present invention requires no relocation of the memory addresses, and therefore, the time for the linking processing is sufficiently small as compared with the relocatable assembler. Accordingly, in the case of re-assembling a source program having a modification added to a module positioned in a second half of the source program, the assemble can be completed within a short time. For example, when a modification has been added to the module C of the source program 71 in FIG. 7, the re-assemble of the source program 71 can be executed within a time remarkably shorter than for the conventional assembler.

Figure 1:
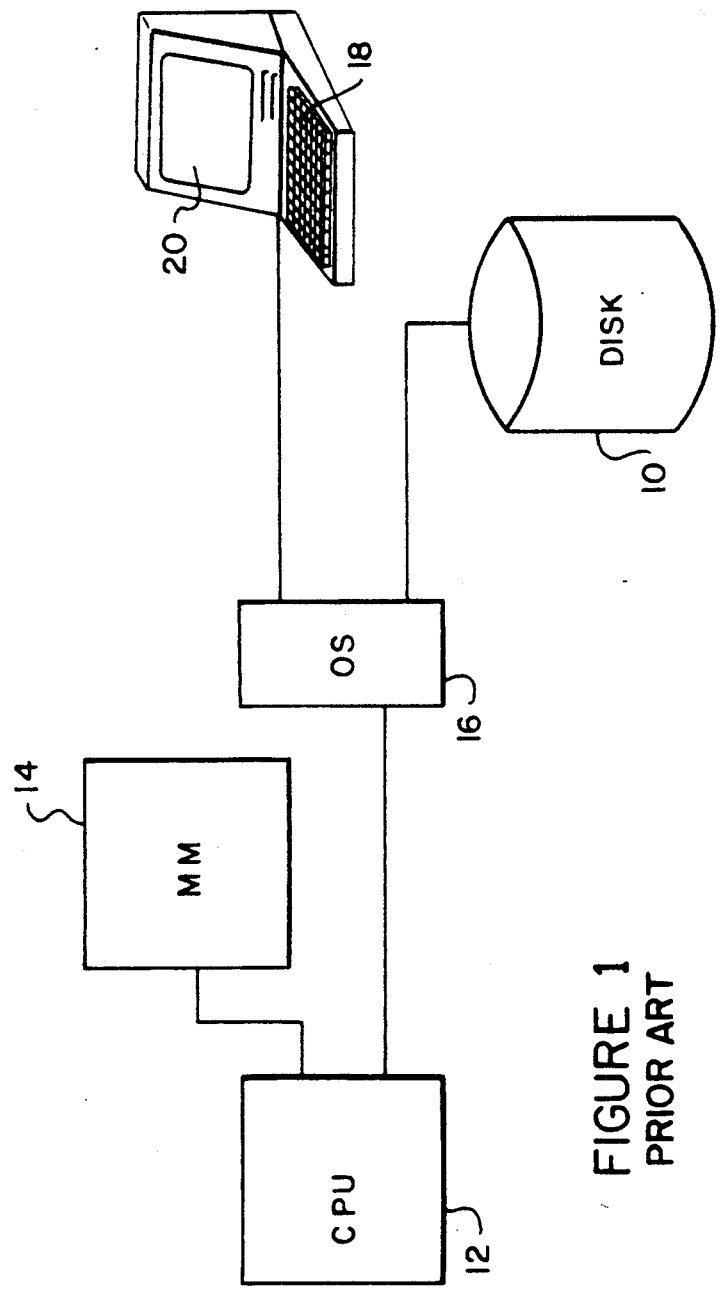
FIG. 1 a block diagram illustrating a basic construction of a conventional assembler system.
Figure 2:
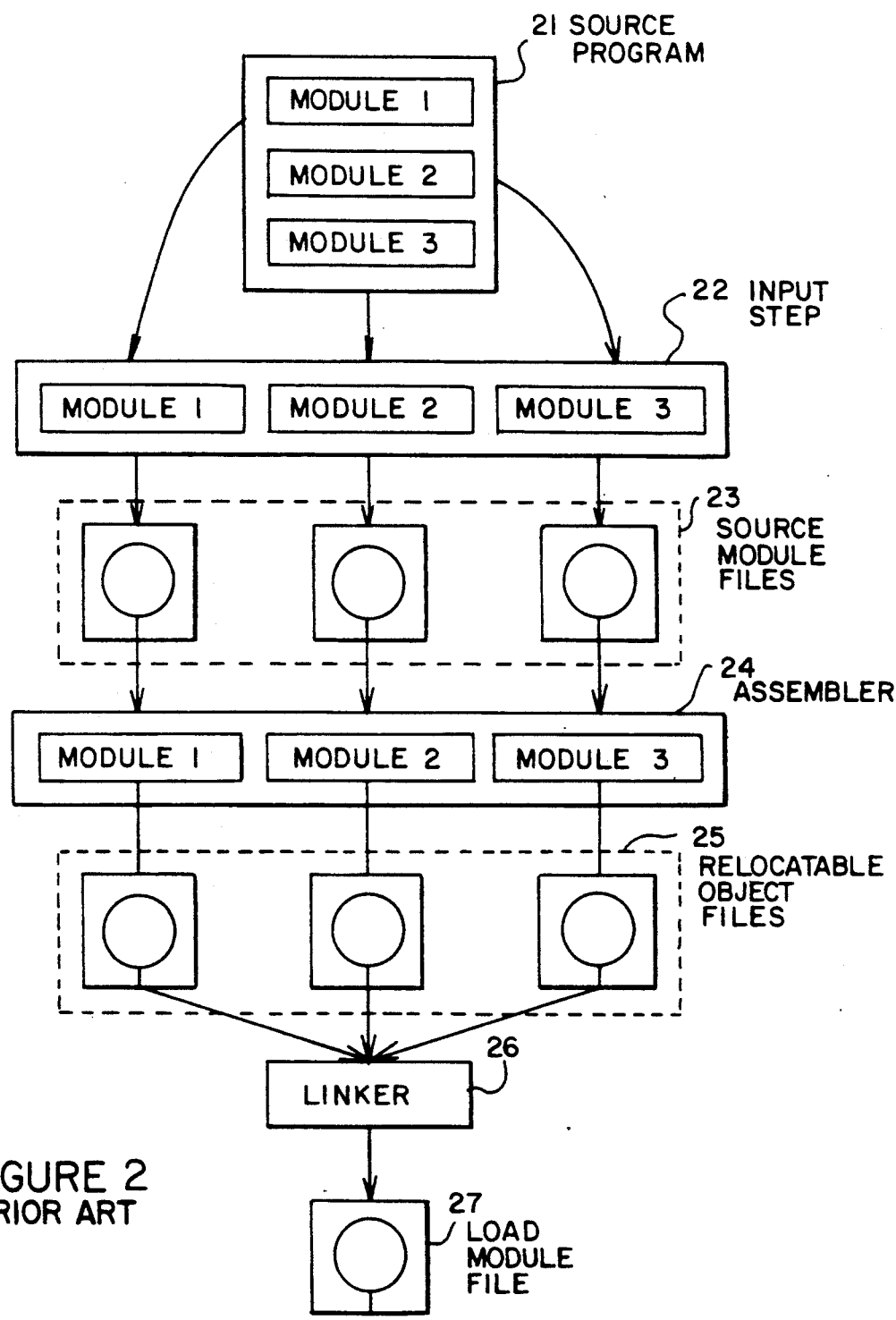
FIG. 2 a block diagram illustrating a basic conceptual construction of a conventional relocatable assembler system.
Figure 4:
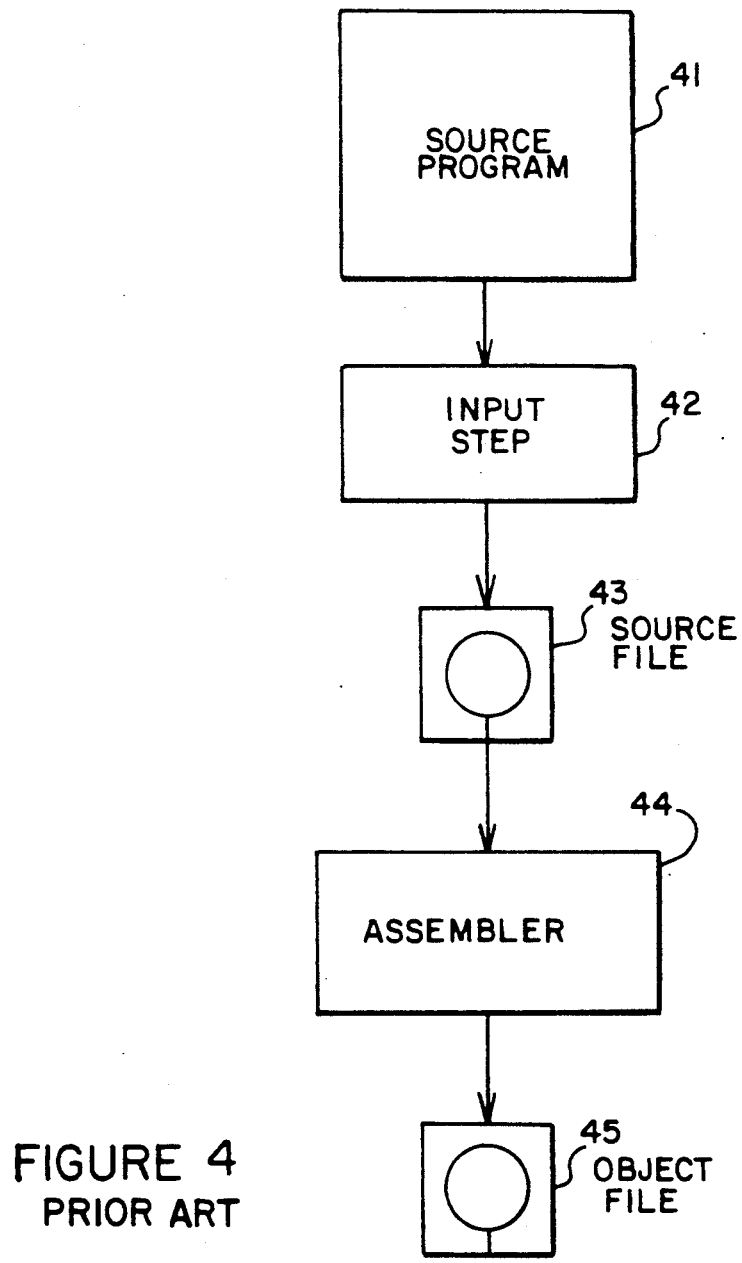
FIG. 4 a block diagram illustrating a basic conceptual construction of a conventional absolute assembler system.
Figure 12:
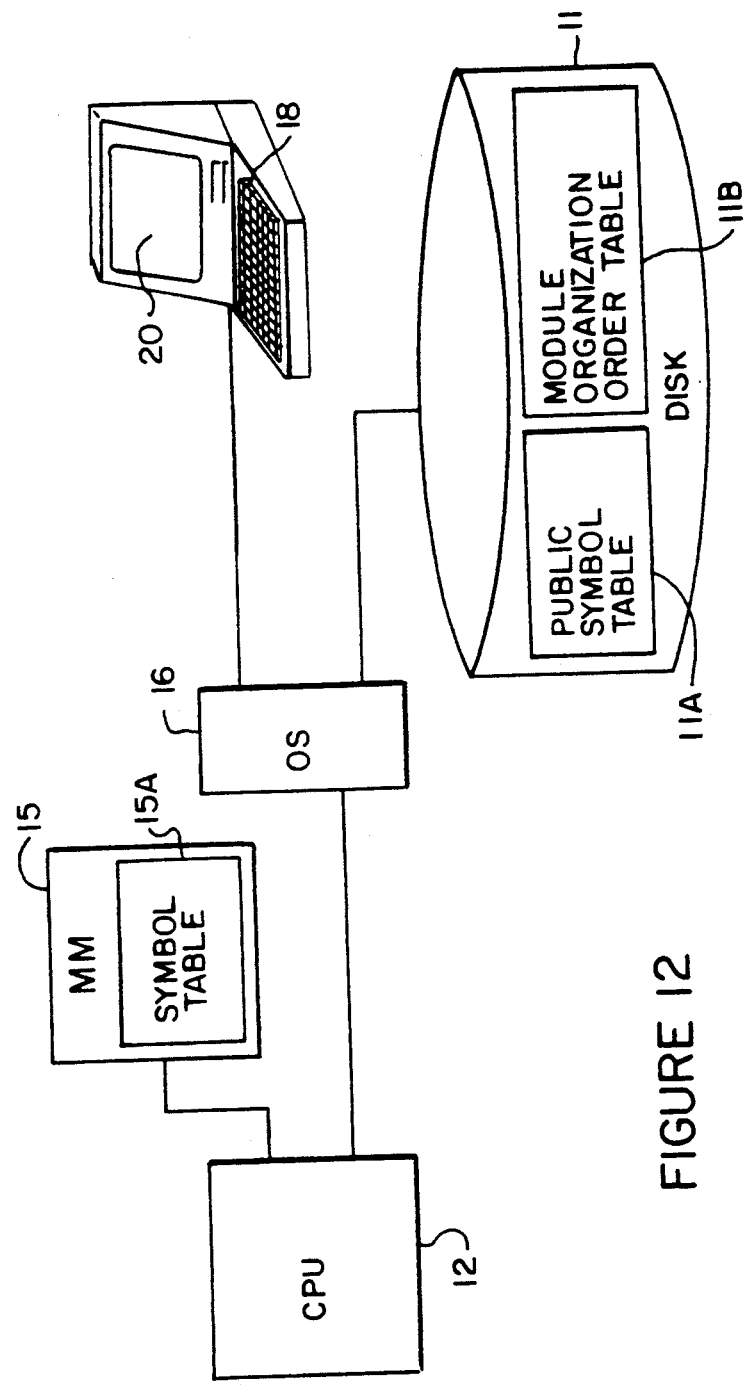
FIG. 12 is a block diagram illustrating an assembler system in accordance with a third embodiment of the present invention.

Referring to FIG. 12, there is shown an assembler system in accordance with a third embodiment of the present invention. In FIG. 12, elements similar to those shown in FIG. 1 are given the same reference Numerals. As seen from comparison between FIGS. 1 and 12, a feature of the system shown in FIG. 12 different from the system shown in FIG. 1 lies in the content of an auxiliary storage 11 which corresponds to the auxiliary storage 10 shown in FIG. 1. The auxiliary storage 11 not only stores a source program and an improved assembler program but also has a public symbol table 11A for storing public symbols defined on the basis of the source program and a module organization order table 11B for designating an organization order of modules. In addition, a main memory 15 corresponding to the main memory 14 shown in FIG. 1 includes a symbol table 15A which is rewritten for each of the modules.

The assembler system adopts the 2-pass assemble system for each of division modules. In a PASS 1, local symbols are extracted from one source module, and character strings of the extracted local symbols and corresponding values are stored in the symbol table 15A. In addition, there is extracted an external (EXTRN) symbol or symbols which are defined by an EXTRN pseudo instructions declaring that a reference is made to a symbol defined in another module, and then, the character strings for the EXTRN symbols are stored in the symbol table 15A. In a succeeding PASS 2, the public symbols are extracted from the source module, and character strings of the extracted public symbols and corresponding values are stored in the public symbol table 11A. Furthermore, the unsolved EXTRN symbols stored in the symbol table 15A is searched, and values corresponding to the unsolved EXTRN symbols are located from the public symbol table 11A, so that the corresponding values located are outputted to the symbol table 15A. In this operation, when the values corresponding to the unsolved EXTRN symbols are searched from the public symbol table 11A, reference is made to the module organization order table 11B so that a search is made only to public symbols extracted in modules positioned or organized before the source module being currently assembled.

An operation will be explained with reference to flow charts shown in FIGS. 13 and 14.

Figure 13:
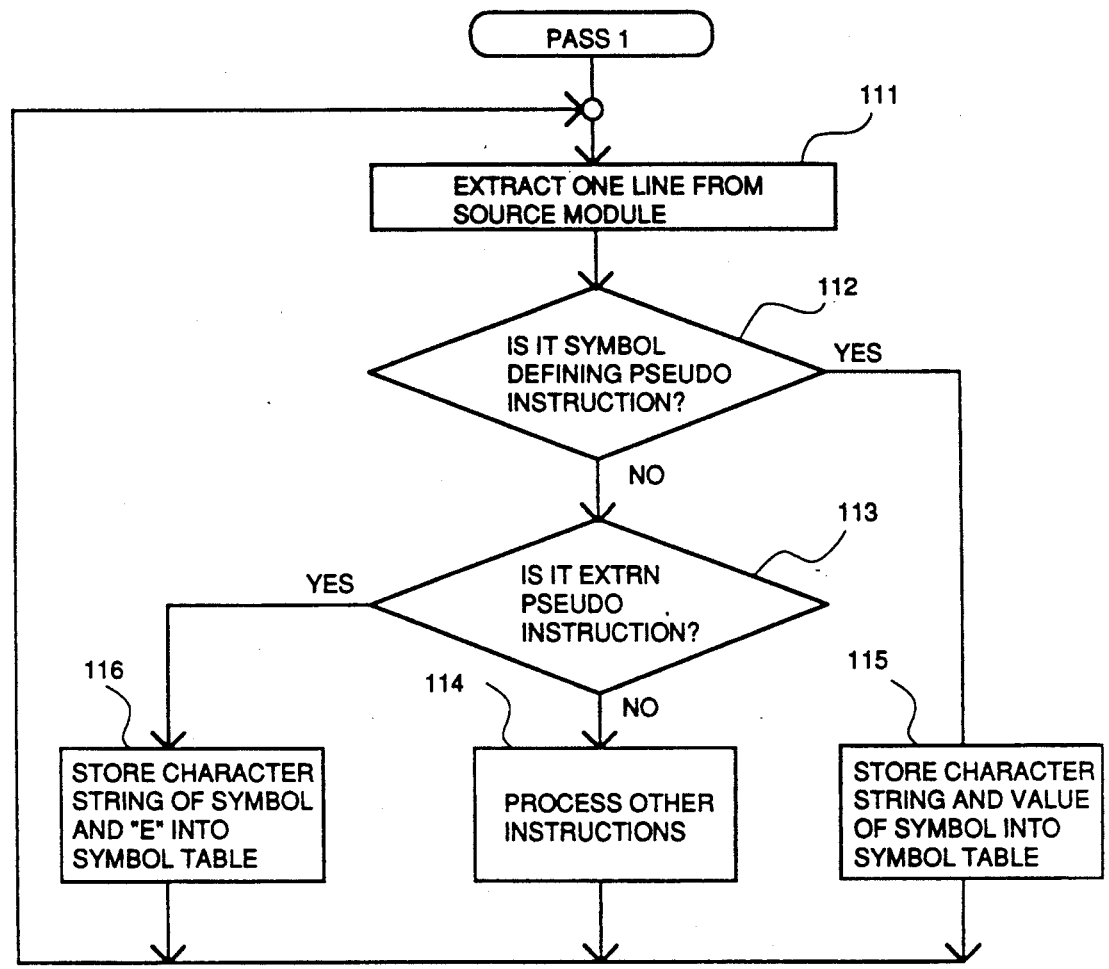
FIG. 13 is a flow chart indicating the operation in connection with the symbols in the PASS 1 of the 2-pass assembler shown in FIG. 12.

FIG. 13 is a flow chart indicating the operation in connection with the symbols in the PASS 1 of the 2-pass assembler. In a step 111, one line is extracted from the source module, and in a step 112, there is discriminated whether or not the extracted line includes a symbol defining pseudo instruction defining any data or address for a name. If it includes the symbol defining pseudo instruction, the processing goes to a step 115 where the found symbol and a value assigned to the symbol are stored in the symbol table 15A. Thereafter, the processing is returned to the step 111. On the other hand, if the one line extracted in the step 111 does not includes the symbol defining pseudo instruction, the processing goes to a step 113. In the step 113, there is discriminated whether or not there exists an EXTRN pseudo instruction for declaring that a reference is made to a symbol defined externally of the module being currently assembled, together with an indication of the symbol. If the EXTRN pseudo instruction is detected, the processing goes to a step 116 where the character strings of the symbol and a character (for example "E") indicative of the EXTRN symbol are stored in the symbol table 15A. Then, the processing is returned to the step 111. On the other hand, if no EXTRN pseudo instruction is detected, the processing for other than the symbol is performed in a step 114, and then, after the processing has been completed, it returns to the step 111.

Figure 14:
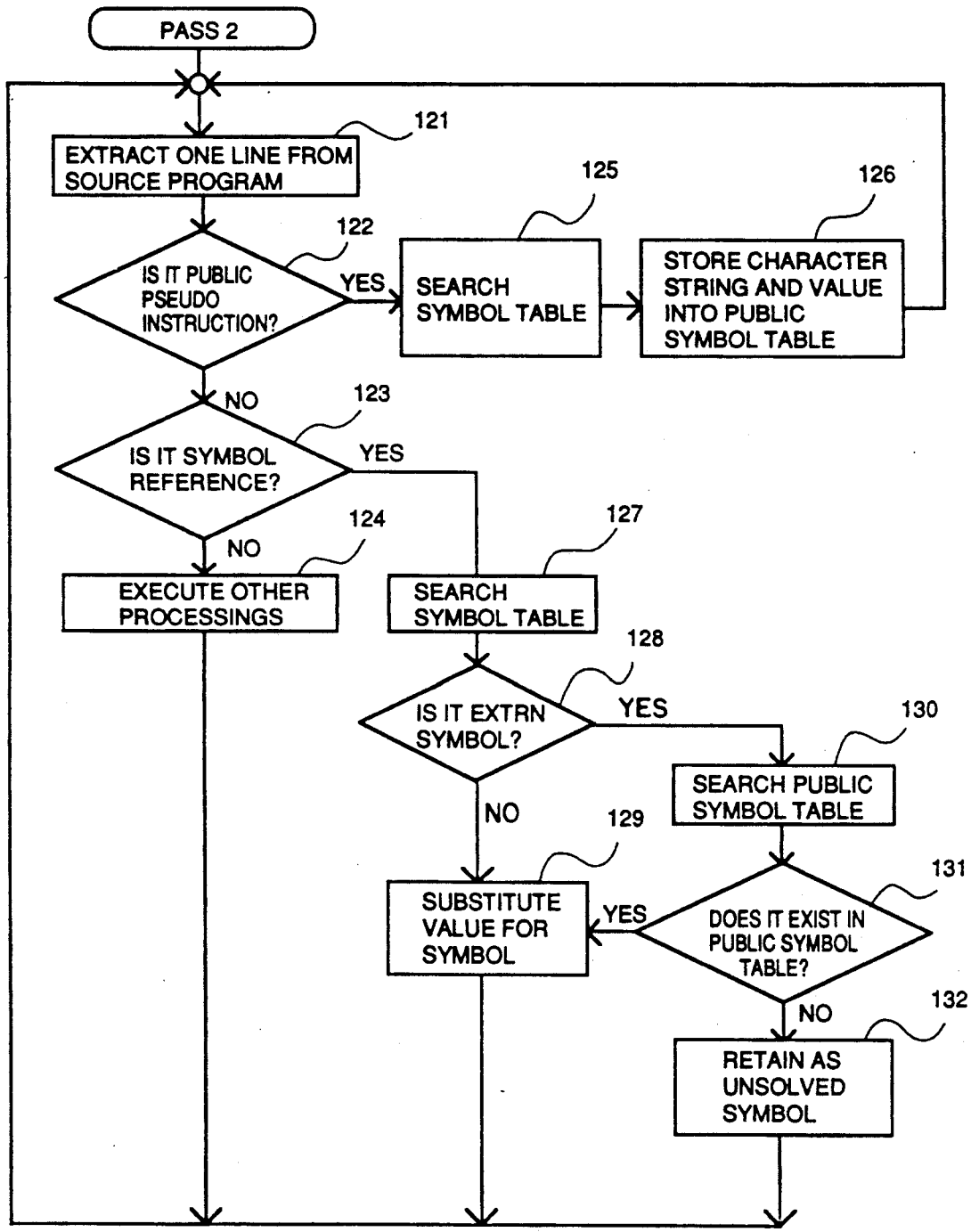
FIG. 14 is a flow chart indicating the operation in connection with the symbols in the PASS 2 of the 2-pass assembler shown in FIG. 12.

Turning to FIG. 14, there is shown a flow chart illustrating an operation in the PASS 2 of the 2-pass assemble system. In the PASS 2, the source program is analyzed again from its head. In a step 121, one line is extracted from the source module, and in a step 122, there is detected whether or not the extracted line includes a PUBLIC pseudo instruction declaring that a symbol is a public symbol. If the PUBLIC pseudo instruction is detected, the character string of the symbol described in the extracted line is searched from the symbol table 15A in a step 125, and then, a found character string of the symbol and a corresponding value are stored in the public symbol table 11A. Thereafter, the processing is returned to the step 121.

If it is judged in the step 122 that the PUBLIC pseudo instruction does not exist, whether or not a symbol reference is made in the extracted line is discriminated in a step 123. If a symbol is referred to, a symbol which is the same as the found symbol is searched from the symbol table 15A in a step 127. Then, in a step 128 there is detected whether or not "E" has been described in the symbol found from the symbol table 15A. In other words, whether or not the symbol is referred to a value defined in an external module is detected. If the symbol is referred to a value defined in an external module, it goes to a step 130 where a symbol having the same character string as that of the above symbol is searched from the public symbol table 11A which has been prepared at the time of assembling the modules included in the same assembling unit. In a step 131, there is discriminated whether or not the symbol concerned exists in the public symbol table 11A, and if it exists, it goes to a step 129 where a value assigned to the symbol is substituted for the symbol. On the other hand, if the symbol concerned does not exist in the public symbol table 11A in the step 131, the symbol is retained as an unsolved symbol.

In the step 128, if it is judged that the symbol found in the symbol table does not have the term of "E", the value assigned to the symbol is extracted and is substituted for the symbol. After the processing of the step 129 or 132 has been completed, the processing is returned to the step 121. Incidentally, when the symbol reference is made, if the corresponding symbol is not found in the symbol table, a symbol undefined error is outputted. However, a step for this processing is omitted for simplification of the explanation.

The above mentioned processing will be described in more detail with reference to FIGS. 15A to 17B, in the case of the source program shown in FIG. 3A.

FIGS. 15A, 16A and 17A show the contents of the symbol tables for the modules 31, 32 and 33, respectively, and FIGS. 15B, 16B and 17B show the contents of the public symbol tables for the modules 31, 32 and 33, respectively. On the other hand, assume here that the organization order is designated in the named order of modules 31, 32 and 33 in the module organization order table 11B.

In a PASS 1 of the assemble for module 31, a symbol defining pseudo instruction SYMA is firstly extracted, and a character string SYMA for the instruction and a corresponding value VALUEA are stored in the symbol table 15A. Then, an EXTRN pseudo instruction is extracted, and a character string SYMC for the instruction and the character "E" indicative of undefinition or unsettlement of the value are stored in the symbol table 15A, as shown in FIG. 15A.

In a PASS 2, a PUBLIC pseudo instruction is extracted from the symbol table 15A, and the character strings SYMA and the value VALUEA of the found PUBLIC pseudo instruction are stored in the public symbol table 11A as shown in FIG. 15B. Furthermore, the symbol reference instruction BR is extracted. Since the extracted symbol SYMC is an EXTRN symbol, the public symbol table 11A is searched. However, in this case, the symbol SYMC has not yet registered in the public symbol table, the value of SYMC is still undefined. With this, the processing is completed.

In an assemble processing for the module 32, a symbol defining pseudo instruction SYMB and an EXTRN pseudo instruction SYMA are extracted, respectively, in a PASS 1. As a result, the symbol table 15A assumes the content as shown in FIG. 16A. In a PASS 2, a PUBLIC pseudo instruction SYMB is newly registered in the public symbol table 11A. In addition, in this PASS 2, the symbol reference instruction BR designates the symbol SYMA. At this time, since the value VALUEA of the symbol SYMA has already been registered in the public symbol table 11A as shown in FIG. 16B, the value VALUEA is substituted as the value of SYMA in the symbol table 15A. Thus, the symbol table 15A for the module 32 has been established with reference to the public symbol table 11A.

Similarly, in the assemble for the module 33, the public symbol table 11A registers therein the value of the public symbol SYMB referred to in the module 33 as shown in FIG. 17B, the value of the symbol SYMB in the symbol table can be determined with reference to the public symbol table 11A as shown in FIG. 17A.

Accordingly, when the assemble for all the three modules 31, 32 and 33 has been completed, the remaining unsolved symbol is only the symbol SYMC in the module 31. Therefore, the load of the succeedingly performed link processing can be greatly decreased.

As mentioned above, in the case of assembling the source module shown in FIG. 3A, since the symbols SYMA and SYMB referred to in the modules 32 and 33 are defined at a module having an early address, when these modules are assembled, the values registered in the public symbol table can substituted for the symbols SYMA and SYMC.

Incidentally, in the above mentioned embodiment, the auxiliary storage used for storing the public symbols is composed of a disk memory which has a relatively slow access speed. However, a so-called RAM composed of semiconductor memory or a magnetic bubble memory can be used as the auxiliary memory.

The above mentioned assembler in accordance with the present invention is very effective in a so-called single chip microcomputer. The reason for this will be explained below. The single chip microcomputer is such that a program memory (ROM) and a data memory (RAM) are different from each other in an address space. In other words, the data storage ares is subject to a severe restriction. Because of this, it is a current practice to define symbols at a beginning of a source program. On the other hand, undefined symbols are concentrated at a label indicative of program memory addresses, but the label is of a local symbol in most cases, due to localization of programs. Therefore, in the single chip microcomputer, most of public symbols are positioned in modules having late addresses. As a result, when these modules are assembled, most of the public symbols can be consequently solved. Accordingly, the number of the unsolved symbols at the completion of the assemble can be greatly decreased. Thus, if the assembler of the present invention is used for translating a source program for a single chip microcomputer into a machine language, the speed of the assemble can be remarkably increased as compared with the conventional ones.

As mentioned above, the assembler system in accordance with the present invention is such that when the source program divided into a plurality of modules is assembled, local symbols, which can be referred within only a module in which a symbol definition is being conducted, are stored in a main memory, and on the other hand, public symbols referred to from external modules other than the module in which a symbol definition is being conducted are stored in a public symbol table prepared in an auxiliary storage, so that these information will be retained even if the symbol table in the main memory is broken. With this arrangement, a public symbol defined in a module assembled before the module being currently assembled, can be searched from the public symbol table, and therefore, can be translated into a machine language. As a result, the number of the unsolved symbols for which a memory address to be loaded has been determined but a value has not yet assigned, can be greatly decreased at the time of completion of the assemble. In addition, since the module organization order at the time of the assemble is designated, it is possible to assign a machine language instruction to an absolute address when the assemble is executed. Therefore, the load of the linker can be considerably decreased, and so, the assemble speed can be remarkably increased.

In the above mentioned embodiments, by designating the organization order of the modules and searching the public symbol table, it is possible to assign the absolute address to the machine language instructiohs at the time of assemlble. Thereofe, the load of the linker for the processing after the assemble can be greatly decreased, and so, the assemble speed can be increased.

The invention has thus been shown and described with reference to the specific embodiments. However, it should be noted that the present invention is in no way limited to the details of the illustrated structures but changes and modifications may be made within the scope of the appended claims.

We claim:

1. An assembler system comprising:
    first means for storing source code modules and object code modules assembled from said source code modules:
    second means for storing an order of assemble of said source code modules;
    third means for determining whether.or not an object code module has been assembled from one of said source code modules;
    fourth means for storing a prior assemble order of said source code modules;
    fifth means for storing a source code module production time for each source code module with an object code module production time for said object code module assembled from said each source code module;
    sixth means, coupled to said first, second, third, fourth, and fifth means, for evaluating each source code module in accordance with said assemble order stored in said second means to identify a first one of said source code modules for which
        (1) an object module has not been assembled,
        (2) said source code module production time for said each source code module is later than said object code module production time for said object code module assembled from said each source code module, or
        (3) the position of said each source code module in said assemble order stored in said second means differs from the position of said each source code module in said prior assemble order stored in said fourth means; and
    means for assembling said identified first source code module and each succeeding source code module, as ordered in said assemble order stored in said second store means, into object code modules.

2. An assembler system as recited in claim 1, wherein said fourth means stores said prior assemble order within said object code modules.

* * * * *